3,203,816
GLASS MAKING BATCH AND METHOD
Fred Larry Bull, Edward M. Lobdell, and Joseph R. Monks, Jr., Toledo, Ohio, assignors to Owens-Illinois Glass Company, a corporation of Ohio
No Drawing. Filed Sept. 13, 1960, Ser. No. 55,728
3 Claims. (Cl. 106—54)

The present invention relates to a method of making a colored glass and to a batch for making such glass. More particularly, the invention proposes the addition of coloring constituents, such as alkali metal chromates, and oxidizing agents, such as alkali metal nitrates, to a glass batch as an aqueous solution.

In the manufacture of colored glasses, such as glasses containing chromium oxide, relative minute amounts of colorant materials are added. For example, less than one-fourth of one percent chromium oxide is usually present in such colored glasses. The difficulties of accurately measuring and adding such materials and adequately mixing such minute amounts with the remainder of the glass batch so as to obtain a homogeneous mixture for melting will be readily appreciated. Additionally, the colorant materials may be strongly deliquescent, e.g., sodium dichromate, or may cause severe dusting conditions in the batch mixing apparatus or even within the melting tank. Since many such dusts are toxic and all are at least irritating to the skin and eyes of an operator, additional material handling problems are presented by the utilization of such powdered materials.

The present invention proposes the addition of coloring constituents to a pulverant glass batch as an aqueous solution. By the use of conventional fluid handling equipment, such solutions can be accurately metered into the dry batch constituents for intimate admixture therewith, preferably during the batch mixing operation. Further, the addition of the aqueous solvent not only reduces dusting of the colorant material, per se, but also aids in reducing dusting of the overall glass batch. Additionally, the water added as the solvent phase of the colorant solution aids in melting of the batch.

More specifically, the present invention proposes the addition of an alkali metal chromate, preferably sodium dichromate, and an oxidizing agent, preferably sodium nitrate, to a dry pulverant glass batch as an aqueous solution. Of course, separate solutions may be utilized if desired, but by maintaining proper proportions between the two ingredients, they may be dissolved into a common solution. Further, the solution concentration of the sodium dichromate may be as low as three percent or as high as fifty percent, and the sodium nitrate solution concentration may also fall within the same range. If desired, hot water may be utilized to form the solution and to increase the solution concentration. Preferably, the amount of water added is less than that which would materially interefre with the free pulverant flow of the glass batch, more particularly less than about two hundred pounds of water per ton of sand in the glass batch is preferred.

One further advantage resides in the utilization of a sodium dichromate solution inasmuch as it eliminates the handling difficulties normally associated with sodium dichromate because of its deliquescent nature. Sodium dichromate upon standing absorbs atmospheric or ambient moisture, and the substantial handling and measuring difficulties encountered have led to the use of potassium dichromate as a glass colorant despite the substantially greater cost of the potassium. By the utilization of aqueous solutions, such difficulties are avoided and the use of sodium dichromate becomes feasible.

It is, therefore, an important object of the present invention to provide a method for making a colored glass by the addition of coloring constituents to the glass batch as an aqueous solution.

Another important object of this invention is the provision of a glass batch to which coloring constituents, such as colorant oxides and oxidizing agents, are added as aqueous solutions.

It is a further object of the instant invention to provide a method of making a colored glass by the addition to a pulverant glass batch of alkali metal chromates and alkali metal oxidizing agents dissolved in water.

It is yet another object of this invention to provide a colored glass batch to which colorant and oxidizing constituents are added as aqueous solutions, a preferred coloring constituent being sodium dichromate and a preferred oxidizing agent being sodium nitrate.

Still another important object of this invention is the provision of a method of making a colored glass by the addition to a pulverant glass batch of water having dissolved therein sodium dichromate and sodium nitrate as coloring constituents for the batch, the colorant solutions being added in such amounts as to provide less than about two hundred pounds of water per ton of sand in the batch so that the batch can still be handled in an essentially dry, pulverant condition.

As above explained, the present invention is particularly adapted to the utilization of sodium dichromate as a colorant and sodium nitrate as an oxidant, the colorant and the oxidant being added either jointly or separately as aqueous solutions. Table I sets forth four glass batches to which such aqueous solutions of colorant and oxidant were added to yield, upon melting, colored glasses having the theoretical analyses set forth in Table II.

*Table I*

| Batch Ingredients | Parts by Weight | | | |
|---|---|---|---|---|
| | 1 | 2 | 3 | 4 |
| Sand (High Al$_2$O$_3$) | 2,000 | | | |
| Sand | | 2,030 | 2,030 | 2,030 |
| Lime | 330 | 520 | 520 | 430 |
| Syenite | | 183.5 | 183.5 | 210 |
| Soda Ash | 565 | 790 | 790 | 580 |
| Barytes | | 28 | 28 | |
| Fluospar | | 5 | 5 | |
| Na$_2$Cr$_2$O$_7$·2HOH | 14.3 | 12.6 | 12.6 | 14.3 |
| CuO (Black) | | | 2.4 | |
| Sodium Nitrate | 25 | 25 | 25 | 2 |
| | | | | 25 |

*Table II.—Theoretical analysis*

| Oxide | Percent by Weight | | | |
|---|---|---|---|---|
| | 1 | 2 | 3 | 4 |
| SiO$_2$ | 65.00 | 71.20 | 71.14 | 75.00 |
| R$_2$O$_3$(Fe$_2$O$_3$+Al$_2$O$_3$+Cr$_2$O$_3$) | 8.35 | 1.6 | 1.6 | 1.78 |
| CaO | 8.60 | 9.02 | 9.01 | 9.30 |
| MgO | 0.30 | 0.70 | 0.70 | 0.30 |
| BaO | | 0.60 | 0.60 | |
| Na$_2$O | 15.60 | 16.20 | 16.19 | 13.00 |
| K$_2$O | 1.90 | 0.40 | 0.40 | 0.30 |
| F | | 0.08 | 0.08 | |
| Cr$_2$O$_3$ | 0.20 | 0.20 | 0.20 | 0.20 |
| CrO$_3$ | 0.05 | | | 0.05 |
| CuO | | | 0.08 | 0.07 |

The R$_2$O$_3$ in the above analysis represents the total iron, aluminum and chromium oxides present. The total chromium content is also given as Cr$_2$O$_3$ and as such is inclusive of the chromium oxide present in compositions 1 and 4 as hexavalent CrO$_3$.

The sodium dichromate is added to the batch as an aqueous solution containing 50% by weight

and the sodium nitrate is added as an aqueous solution containing 35% by weight $Na_2NO_3$. The batch thus contains from about 58 to 61 pounds of water per ton of sand.

Another example utilizing a glass batch to which sodium dichromate and sodium nitrate are added is set forth in Table III to yield a glass of the theoretical composition of Table IV.

*Table III.—Batch composition*

| | Parts by weight |
|---|---|
| Sand | 2000 |
| Soda ash | 761 |
| Limestone | 489 |
| Aplite | 195 |
| Gypsum | 40 |
| $Co_3O_4$ | 2–3 oz. |
| Sodium dichromate | 4.25 |
| Sodium nitrate | 5 |
| Iron chromite | 4.63 |
| Water | 14 |

*Table IV.—Theoretical composition*

| | Percent by weight |
|---|---|
| $SiO_2$ | 72.17 |
| $Al_2O_3$ | 1.71 |
| $Fe_2O_3$ | 0.099 |
| $TiO_2$ | 0.01 |
| CaO | 10.01 |
| MgO | 0.10 |
| $Na_2O$ | 15.57 |
| $K_2O$ | 0.18 |
| $Cr_2O_3$ | 0.143 |
| CoO | 0.005 |

The dichromate and the sodium nitrate were added as aqueous solutions of 50% and 35% by weight, respectively. The amount of water can be increased to 200 pounds in the batch of Table III without varying the final theoretical composition of Table IV. All or only a part of the water may be used to dissolve the colorant materials as desired, and the solute concentrations can also be varied considerably.

In connection with the composition of Table III to obtain the glass of Table IV, a melting temperature (at the bridgewall) of 2750° F. was used and the refiner temperature was maintained within the range of 2300° F. to 2360 F. Similar temperatures were utilized for the batch compositions of Table I to obtain the theoretical compositions of Table II.

So far as the amount of solution added is concerned, this is entirely dependent upon the amount of water desired in the glass batch, and it has been found that water amounting to from 30 to about 200 pounds per ton of sand can be accommodated. Preferably, less than about 120 pounds of water per ton of sand is utilized to avoid the necessity of special handling equipment, such as vibrators on batch buckets and the like. The concentration of the solution added to the batch may be adjusted, or water in addition to that used as the solvent can be added, in accordance with the amount of water which is added to the batch, and solution concentrations ranging from three to fifty percent solid content can be readily accommodated. Further, the sodium dichromate and the sodium nitrate can be added as separate solutions or as a common solution.

The method of adding the solution is also susceptible to substantial variations, although it is preferred that the additions take place during the mixing of the batch so that the solution may become thoroughly admixed with the other batch constituents. In fact, such thorough mixing forms one of the primary advantages of the present invention due to the relatively small amounts of colorant and oxidizing constituents added to the batch.

From the foregoing description various other advantages of the present invention will become immediately evident. For example, sodium dichromate is substantially less expensive than potassium dichromate, but soduim dichromate has been heretofore unusable as a colorant for glass batches because of its extremely deliquescent nature. The attendant material handling difficulties will be readily appreciated by those skilled in the art, and such difficulties are eliminated by utilization of the instant method and the addition of the dichromate as a solution. Thus, it is possible to utilize the cheaper sodium dichromate, with substantial savings in batch cost.

In summary, the generic aspects of the present invention may be summarized as follows:

I. The colorant solutions of the present invention are preferably added to glass batches effective to yield, after melting and exclusive of colorant additions, final theoretical compositions with the range—

| Oxide: | Percent by weight |
|---|---|
| $SiO_2$ | 60–75 |
| $Al_2O_3$ | 0.1–10 |
| CaO | 6–14 |
| BaO | 0–1.0 |
| $B_2O_3$ | 0–5 |
| MgO | 0–8 |
| $Na_2O$ | 10–20 |
| $K_2O$ | 0–3 |

II. The various colorant oxides present in the molten glass may include oxides of iron (as either $Fe_2O_3$ or FeO), chromium (as either $Cr_2O_3$ or $CrO_3$), cobalt or copper, within the ranges—

| Colorant oxides: | Percent by weight |
|---|---|
| Total iron (expressed as $Fe_2O_3$) | 0.04 to 0.250 |
| FeO | none to 0.015 |
| Total chromium (expressed as $Cr_2O_3$) | 0.015 to 0.26 |
| $CrO_3$ | none to 0.01 |
| Cobalt (as CoO) | none to 0.013 |
| Copper (as CuO) | none to 0.035 |

III. The amount of oxidizing agent (sodium nitrate) added to the batch is dependent upon the extent of oxidation desired within the batch during melting and is particularly related to the amount of $CrO_3$ desired in the molten batch. Generally, an amount of sodium nitrate at least equal in weight to the weight of sodium dichromate is added and of as much as 4 parts by weight sodium nitrate per 1 part of sodium dichromate can be added to obtain a strongly oxidizing batch.

IV. The amount by weight of water added is at least equal to the combination weight of colorant and oxidant added as solute and may be as great as 200 pounds of water per ton of sand in the batch. Preferably the amount of water ranges from about 50 pounds to about 120 pounds per ton of sand. Obviously, all of the water may be added as the solvent phase of the colorant and oxidant solution, or additional water without solute may be added.

We claim:

1. The method of making a colored glass comprising forming a batch, adding to the batch water and an aqueous solution of sodium dichromate and sodium nitrate, the sodium nitrate being present in an amount at least equal to the amount of sodium dichromate, and the water being present in an amount equal to from 50 to 120 pounds of water per ton of sand in the batch, thoroughly admixing the water and the aqueous solution of sodium dichromate and sodium nitrate with the remainder of the batch, and melting the batch to form a molten glass having a theoretical composition:

| Oxide: | Percent by weight |
|---|---|
| $SiO_2$ | 60–75 |
| $Al_2O_3$ | 0.1–10 |
| CaO | 6–14 |
| BaO | 0–1.0 |
| $B_2O_3$ | 0–5 |
| MgO | 0–8 |
| $Na_2O$ | 10–20 |
| $K_2O$ | 0–3 |
| $Cr_2O_3$ | 0.015–0.26 |

2. The method of making a colored glass comprising forming a glass batch containing sand, limestone and sodium carbonate, adding thereto an aqueous solution of an alkali metal dichromate, admixing the solution and the batch, the batch containing from 50 to 200 pounds of water per ton of sand, and melting the glass to form a molten glass having a theoretical composition:

| Oxide: | Percent by weight |
|---|---|
| $SiO_2$ | 60–75 |
| $Al_2O_3$ | 0.1–10 |
| CaO | 6–14 |
| BaO | 0–1.0 |
| $B_2O_3$ | 0–5 |
| MgO | 0–8 |
| $Na_2O$ | 10–20 |
| $K_2O$ | 0–3 |
| $Cr_2O_3$ | 0.015–0.26 |

3. The method of making a colored glass comprising forming a glass batch, adding to the batch water and sodium dichromate and sodium nitrate as solute phases in at least a part of the water, the sodium dichromate being present in an amount to yield 0.015 to 0.26 percent by weight total chromium oxide, the sodium nitrate being present in an amount at least equal to the amount of sodium dichromate, and the water being present in an amount equal to from 50 to 120 pounds of water per ton of sand in the batch, thoroughly admixing the water, sodium dichromate and sodium nitrate with the remainder of the batch, and melting the batch to form a molten glass.

References Cited by the Examiner

UNITED STATES PATENTS

| 2,366,473 | 1/45 | Bair | 106—52 |
| 2,599,349 | 6/52 | Ricker | 106—52 |
| 2,813,036 | 11/57 | Poole | 106—52 |
| 2,923,636 | 2/60 | Swain | 106—52 |
| 3,065,090 | 11/62 | Hopkins | 106—52 |

TOBIAS E. LEVOW, *Primary Examiner.*

JOHN R. SPECK, *Examiner.*